Nov. 9, 1943. E. SCHWARZ 2,333,745
METHOD OF MAKING LONG PRESSED TUBULAR GLASS STRUCTURES
Original Filed Feb. 13, 1939 3 Sheets-Sheet 2
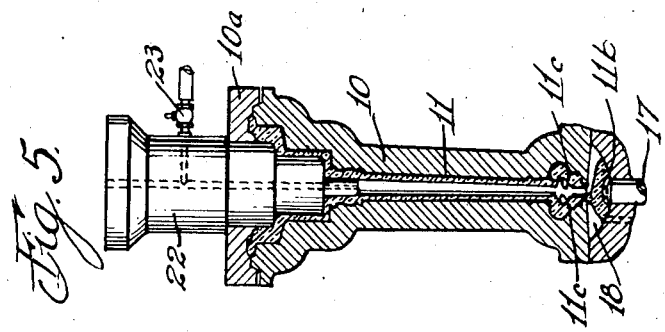
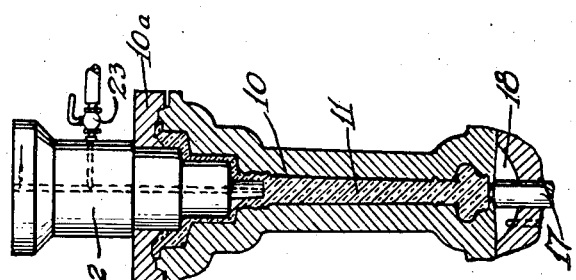
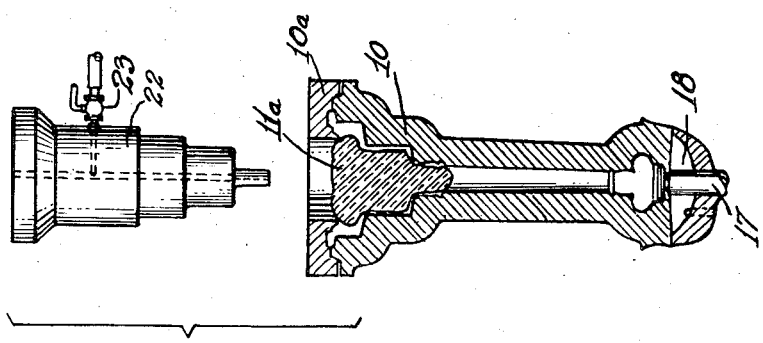
INVENTOR.
EUGENE SCHWARZ
BY Albert E. Bell
ATTORNEY.

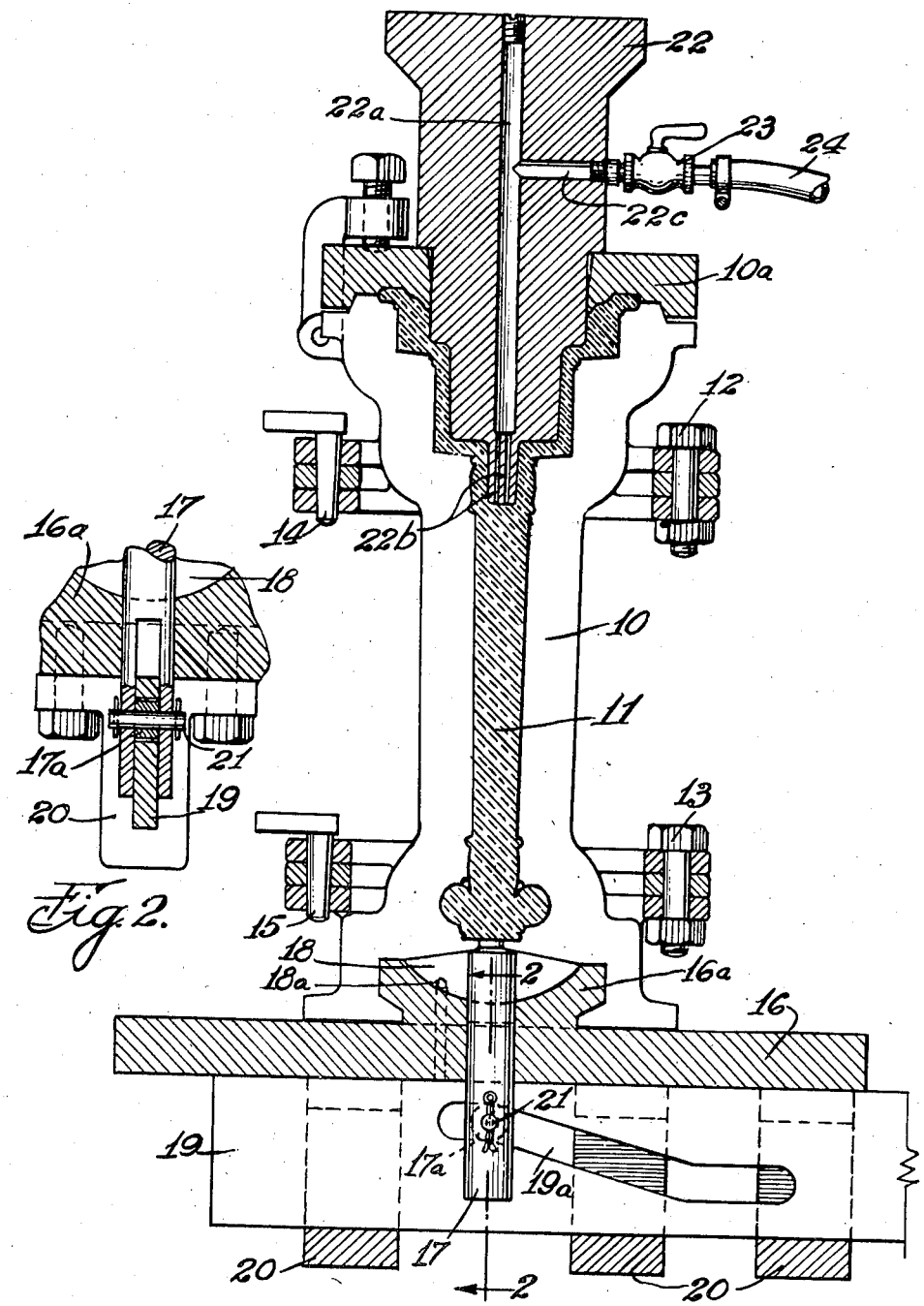

Nov. 9, 1943.                    E. SCHWARZ                    2,333,745
            METHOD OF MAKING LONG PRESSED TUBULAR GLASS STRUCTURES
                 Original Filed Feb. 13, 1939      3 Sheets-Sheet 3
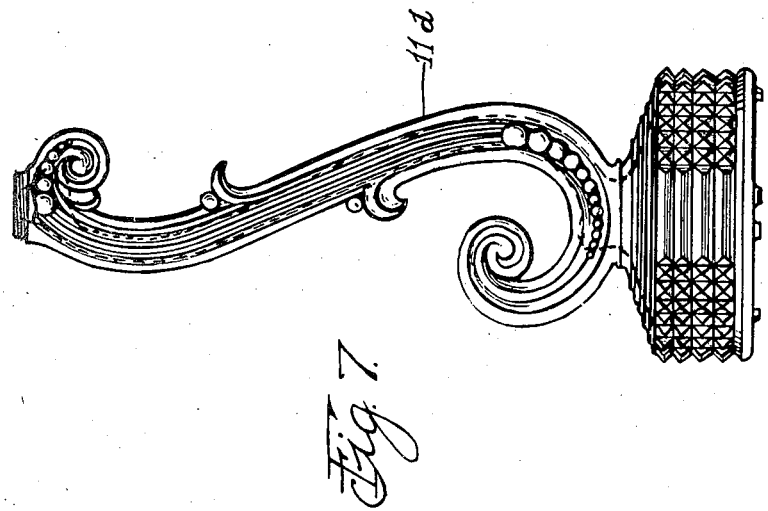
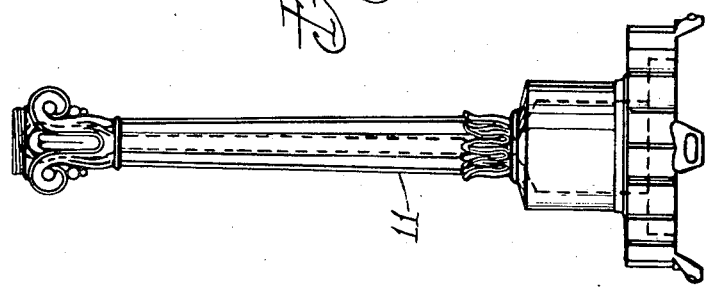
INVENTOR.
EUGENE SCHWARZ
BY Albert C. Bell
ATTORNEY.

Patented Nov. 9, 1943

2,333,745

UNITED STATES PATENT OFFICE 2,333,745

METHOD OF MAKING LONG PRESSED TUBULAR GLASS STRUCTURES

Eugene Schwarz, Alexandria, Ind., assignor to The Mantle Lamp Company of America, Chicago, Ill., a corporation of Illinois Original application February 13, 1939, Serial No. 256,046. Divided and this application October 9, 1940, Serial No. 360,365

7 Claims. (Cl. 49—80)

My invention relates to an improved process for making pressed glassware by which a carefully determined quantity of molten glass is placed in a mold and pressed against the surface of the mold by the insertion of a plunger part way into one end of the mold, said plunger being of such dimensions as to press the glass in the mold against its entire surface, and after the glass engaging the mold surface has set, the still fluent central or axial portion of the glass between the end of the plunger and the other end of the mold, is expelled and blown out from the molded and set glass structure by gas under pressure, said gas being preferably introduced through the plunger, said other end of the mold being open at the time, to permit the expelling operation. The process described may be used effectively where it is desirable to make as integral structures, molded glass pedestals and slender columns for any purpose, for example, for use as electric lamp standards, the result with such lamp structures being that the hollow columns serve as conductor passageways for containing electric conductors extending from within the bases, through the columns of the lamps to the sockets thereof.

My improved method has the advantage of producing any desired conformation of hollow glass structure, corresponding to the mold conformation, so that any desired ornamentation may be employed that will permit the mold to be opened and the glass structure removed therefrom, and at the same time the entire glass structure is unitary from end to end and may with glass lamps or glass lamp standards, include in any case, a hollow base, a tubular spindle or standard, and a threaded upper end portion to receive a fitting to support the lamp socket.

My process referred to is operative as a result of the chilling or setting of the exterior portion of the glass in the mold, resulting from contact between the glass and the mold due to the pressing of the glass into the mold by the plunger. At the same time, although the exterior portion of the glass structure has set sufficiently to possess considerable stability, the central axial portion of the glass structure in the mold is still much hotter and sufficiently fluent to respond to the gas admitted axially under pressure against the glass in the mold, as a result of which the central axial portion of the glass that is fluent, is expelled or blown from the remaining portion of the glass structure, leaving the glass structure with a central longitudinal passageway of substantial diameter extending from end to end of the glass structure. At the same time, the gas under pressure in many cases operates during the expelling operation to more intimately press the exterior portion of the glass structure against the mold surface, depending upon the instant of admitting the gas under pressure to the mold. The time of admitting the gas under pressure into the mold, is determined by the thickness of glass wall which it is desired for the finished glass structure to have, as well as by the melting temperature of the glass, the temperature of the mold, the time required for the particular glass to set, and the particular kind of glass used in any case, as a result of which it is impossible to state generally, how long the glass should be in contact with the mold before the gas pressure is applied. It will also be understood that the size of the glass article to be made in the mold has much to do with the time of chilling or setting before the gas under pressure is supplied to the mold; in some cases where a relatively large glass article is desired to have relatively thin walls, the gas under pressure is applied promptly after the pressing operation, whereas with the same glass article, if it is desired to have a relatively thick wall, the chilling or setting operation is permitted to proceed for a corresponding length of time, before admitting the gas under pressure to the mold.

This is a divisional application of my copending application Serial No. 256,046, filed February 13, 1939, now Patent No. 2,274,096, issued February 24, 1942.

My invention herein relates to the process described. The above and other objects of my invention will more fully appear by reference to the accompanying drawings illustrating a preferred embodiment thereof, in which—

Fig. 1 is a vertical, central, sectional view through a mold constructed to carry out my process, Fig. 2 is a vertical, central, sectional view through a part of the structure, taken along the line 2—2 in Fig. 1, Figs. 3, 4 and 5 are diagrammatic sectional views illustrating different steps of my process, Fig. 3 showing a mold with a charge of molten glass deposited therein, Fig. 4 illustrating the effect of the plunger in forcing the glass against the surfaces of the mold, and Fig. 5 illustrating the effect of the gas under pressure in ejecting the central axial portion of the molded glass structure, Fig. 6 shows in front elevation, a glass lamp stand having a straight column, produced by my process, and Fig. 7 shows in front elevation, a glass lamp stand having a curved column, produced by my process.

Similar numerals refer to similar parts throughout the several views.

In Fig. 1, I show at 10 a mold for producing glass lamp standards of the kind referred to, in which the base, the spindle or standard of the lamp and the upper end portion of the standard for mounting an electric socket, constitute an integral structure as illustrated at 11. The mold 10 is a split mold hinged together at 12 and 13 and provided with tapered locking pins 14 and 15 for holding the mold in closed condition during the molding of the glass structure. The lower end of the mold is mounted on a base 16 and centered thereon by a flange 16a carried by the base and engaging the lower end of the mold to not only center the mold on the base but also to lock the mold thereon against movement during a molding operation. The base 16 is provided with a lower plunger 17 in axial alignment with the cavity in the mold 10 and movable with sliding engagement through the base 16, to close the lower end of the mold during a molding operation. The flange 16a is provided in its upper portion, with a cavity 18 around the upper end of the plunger 17 to receive the glass expelled from the molded glass structure by the gas under pressure. A cam plate 19 is horizontally supported under the base 16 by supporting guides 20 for horizontal movement, the lower portion of the plunger 17 being slotted so that said plunger spans said cam plate as shown in Fig. 2. The cam plate 19 is provided with a cam slot 19a containing a roller 17a mounted on a rod 21 extending through the lower end portion of the plunger 17, so that movement horizontally of the cam plate 19 moves the plunger 17 either to its upper position closing the lower end of the mold 10, or to its lower position with its upper end substantially in the lower surface of the recess 18, as desired.

The upper end of the mold 10 is provided with a cover plate 10a, through which an upper plunger 22 may move vertically with a sliding fit, said plunger being carried by the ram of a suitable press, not shown. The plunger 22 where it enters the mold 10 is of the general conformation of the mold but of sufficiently smaller dimensions to leave a glass wall around the surface of the mold of a desired thickness. The plunger 22 is provided with an axial bore 22a extending nearly to the lower end of said plunger, from which point small diameter bores 22b connect the bore 22a with the lower end of the plunger through which the bores 22b open. Each bore 22b should be of small enough diameter to prevent the fluent glass from flowing into its lower end and setting therein. The number of said bores 22b employed, determines the rapidity with which a required quantity of ejecting gas can be delivered from the plunger 22 for any particular gas pressure employed. The upper portion of the plunger 22 is provided with a horizontal bore 22c communicating with the bore 22a and connected at its outer end with a suitable stop cock 23 which in turn is connected by a flexible hose 24 with a source of gas under pressure, not shown. The stop cock 23 provides for admitting gas under pressure to the mold when and to the extent desired. While gas of different kinds may be employed, as desired, I find it convenient to use air under pressure, since it is quite effective in removing the central axial portion of the molded glass structure that is still fluent, without detrimental effect of any kind. The plunger 22, in its lowermost position, extends into the mold sufficiently to bring its lower end near the upper end of the spindle portion of the mold.

The recess 18 usually is of sufficient capacity to accommodate any of the expelled or blown out glass due to the admission of gas under pressure to the mold, but in the event of a large quantity of glass being removed from the molded glass structure by the expelling operation, a relief opening or openings 18a are provided from the recess 18 through the base 16.

In carrying out my invention, the plunger 22 is first raised sufficiently to clear the cover plate 10a of the mold, and a charge of glass 11a is placed in the mold as illustrated in Fig. 3, care being taken that the charge shall be sufficient to completely fill the mold when the plunger 22 is forced downwardly into the mold. At this time the lower plunger 17 is preferably held in its uppermost position by the cam plate 19 to close the lower end of the mold. The plunger 22 is then forced downwardly, with the stop cock 23 in closed condition, until the plunger occupies the position shown in Fig. 4, further downward movement of the plunger being prevented by the engagement of a shoulder formed on it with the cover plate 10a, for which condition of the parts, the glass 11 in the mold 10 is forcibly pressed against the surface of the mold. During the pressing operation the plunger 17 preferably remains in its uppermost position, closing the lower end of the mold 10. Where the glass structure has a slender spindle of the type illustrated, I find it generally advisable to open the cock 23 at substantially the time the plunger reaches its lowermost position; the lower plunger 17 should have been moved to its lowermost position by the cam plate 19, at any time that the cock 23 is opened. Where the cross-section of the spindle of the glass structure is relatively large, or a relatively thick tubular wall is desired, a corresponding interval is allowed in which the tubular wall may set, before opening the cock 23; in still other cases, and particularly where spindle structures of small cross-section are involved, I find that the cock 23 may be opened before the plunger 22 has reached its lowermost position. Bearing in mind that the central axial portion of the glass in the mold is still in fluent condition, the gas under pressure admitted into the mold through the lower end of the plunger 22, forces the central axial portion of the glass downwardly from the mold into the recess 18, where it collects as indicated at 11b for removal when the molded glass structure is removed from the mold. During the expelling or blowing operation, the expelled glass follows to some degree the contour of the mold as illustrated at 11c because of the glass being thicker at such points and therefore having a larger cross-section of fluent glass than at other points in the mold. The result as shown in Fig. 5, is a passageway entirely through the glass structure, which is smooth and free from ridges and projections of any kind that might interfere with the use of the passageway to receive electrical conductors in using the glass structure as a lamp standard. The lower end of the mold 10 as indicated in Fig. 1 is preferably provided with threads to similarly thread the glass structure, to receive a fitting of metal or other material for supporting a lamp socket on the lamp standard.

In making small, slender, tubular glass structures of the class referred to, I am able to produce such integral structures having a length of 18 inches or more, and an external diameter of about ⅝ inch, and by the blowing operation I am able to produce a passageway through the slender spindle portion of the structure of about ¼ to ⅜ inch in diameter. I am also able to make similar integral and tubular structures having external diameters of from ¾ inch to 1 inch, which are from 25 inches to 40 inches long. It will be observed that by my invention, integral tubular glass articles of the kind described may be cheaply produced.

Where the lower end of the mold is of small cross-section as illustrated, I find in some cases that the use of the lower plunger 17 is not necessary, because of the slight chilling or setting effect of the glass at the lower end of the mold when it is forced into engagement therewith by the plunger 22. In such cases I find that the molded glass which is slightly chilled or set at the lower end of the mold, is not sufficiently fluent to flow from the mold under the action of the plunger 22, but that it may readily be forced from the remaining glass structure by the supplying of gas under pressure to the mold as described. It will be understood that my invention is also applicable to glass structures of larger diameter than those illustrated, in which cases the use of the lower plunger 17 is desirable and in many cases necessary to retain the glass in the mold during the pressing operation. It will be understood that the process described is applicable to a wide variety of glass articles, and particularly to such articles as cannot be made hollow by ordinary pressing and blowing operations.

While I have illustrated the tubular spindle portion of glass articles made by my described process as straight, it will be understood that said spindle portions may also be curved or of any desired form that can be made in molds by a pressing operation or by pressing and blowing operations, and that in any such case the central longitudinal portion of the spindles may be expelled by gas under pressure in the manner described.

In Fig. 6, I show a lamp stand 11, having a straight column, made as above described, and having an axial passageway extending through its column, made by expelling by gas under pressure, the central axial and fluent portion of the column from the set outer portion thereof, which passageway connects the hollow in the base, with the upper end of the lamp stand. In Fig. 7, I show a similar lamp stand 11d, having a curved column, made in the same manner as the lamp stand shown in Fig. 6, which also has a central passageway extending longitudinally through it from the hollow in its base to the upper end of the lamp stand, and made in the same manner as the passageway through the column of the lamp stand shown in Fig. 6.

While I have shown my invention in the particular embodiment above described, I do not limit myself to the particular construction or steps of treatment illustrated and described, as I may employ equivalents thereof without departing from the scope of the appended claims.

What I claim is:

1. The process of molding elongated tubular glass articles having enlarged integral axially-pierced supporting bases to form a continuous-walled passageway extending entirely through the article, said process including placing a charge of fluent glass in the upper end of an open-ended mold having a cavity conforming in shape to the outside of the article and having a discharge opening at its lower end, the part of the mold in which the integral base is formed being uppermost, forcing the glass while still fluent downward into said mold by mechanical means entering its upper end, the temperature of the mold being sufficiently lower than that of the charge to chill the latter where it comes in close contact with the wall of the mold, introducing a fluid medium axially through said mechanical forcing means substantially simultaneously with said forcing, expelling the fluent interior portion of said charge through said discharge opening, and permitting the retained charge to chill throughout to form a continuous film on the interior of said passageway.

2. The process of making press-molded glass articles having slender tubular columns and enlarged integral hollow supporting bases with substantially vertical inner side walls, including placing a molten glass charge in the base end of a mold cavity disposed base end uppermost and having the conformation of the external surface of the finished article, the opposite end of the mold cavity being closed, filling the mold cavity by pressing the glass charge downwardly by a plunger having the conformation of the finished hollow portion in the base of the article, opening the closed end of the mold and blowing through the plunger against an adjacent surface of the charge substantially in continuation of said pressing, thereby blowing through the column of the article its central and still fluent portion in a direction to force this portion beneath the lower end of the mold cavity to form a passageway through the article, and by said pressing and blowing operations directly producing a finished base and column of the article.

3. The process of molding elongated tubular glass articles having enlarged integral axially-pierced supporting bases to form a continuous-walled passageway extending entirely through the article, said process including placing a charge of fluent glass in the upper end of an open-ended mold having a cavity conforming in shape to the outside of the article and having a discharge opening at its lower end, the part of the mold in which the integral base is formed being uppermost, forcing the glass while still fluent downward into said mold cavity by mechanical means entering its upper end, the temperature of the mold being sufficiently lower than that of the charge to chill the latter where it comes in close contact with the wall of the mold, applying fluid medium under pressure against a top surface of said charge to move said charge downwardly in the mold cavity, and expelling the fluent interior portion of said charge through said discharge opening by said fluid medium.

4. The process of molding elongated tubular glass articles having enlarged integral axially-pierced supporting bases to form a continuous-walled passageway extending entirely through the article, said process including placing a charge of fluent glass in the upper end of an open-ended mold having a cavity conforming in shape to the outside of the article, the part of the mold in which the integral base is formed being uppermost, forcing the glass downward while still fluent into said mold cavity by mechanical means entering the upper end thereof while maintaining the lower end of said mold cavity closed, the temperature of the mold being sufficiently lower than that of the charge to chill the latter where it comes in close contact with the wall of the mold, opening the lower end of the mold cavity and introducing a fluid medium under pressure against a top surface of said charge, and expelling the fluent interior portion of said charge from the lower end of the mold cavity by said fluid medium, said mechanical glass forcing and fluid introducing and expelling steps being carried through as a substantially continuous operation.

5. The process of making press-molded glass stands for electric lamps having slender tubular columns including integral attachment threads at their upper ends and enlarged integral hollow supporting bases having vertical side walls and horizontal top walls spaced above the bottoms of the lamp stands and adjacent the lower ends of the column portions thereof and including integral supporting feet, said process including pressing a molten glass charge from above into the base end of a mold cavity disposed base end uppermost by a plunger having the conformation of the finished hollow portion in the base of the lamp stand, said mold cavity having the conformation of the external surface of the finished lamp stand and having a discharge opening at its lower end, applying pneumatic pressure downward against the adjacent top surface of the charge to blow from the column of the lamp stand its central and still fluent portion, said pressing and blowing forming a substantially continuous operation on the charge, and expelling said central fluent portion through said discharge opening.

6. The process of making a molded glass article having a tubular vertical column with an enlarged upper end portion and having at its lower end an integral supporting base extending from the axis of the column to afford stable support for the article, which process includes placing a molten glass charge in a mold cavity having the conformation of the entire article including its enlarged upper end portion and its base portion and having a discharge opening at its lower end, applying to said charge a pressure to fill the said enlarged portion and the said base portion of the mold cavity and to make contact between the charge and the entire surface of the mold cavity, then as a substantially continuing operation applying pneumatic pressure against the end surface of the charge in the top of the mold and expelling through said discharge opening the still fluent axial portion of the charge in the form of a bubble connected with and projecting from the end of the article, the passageway so produced entirely through the article being of enlarged diameter at the enlarged portion of the article, then removing the article from the mold with its said enlarged portion and supporting base completed as integral parts of the finished article, and then removing the bubble to open the corresponding end of said passageway and to complete the glass article.

7. In the process of making a molded glass electric lamp standard and the like having a passageway extending entirely through it axially and opening through both ends thereof and having a column and an integral supporting base extending laterally to afford stable support for said standard, wherein a glass charge is molded in a mold cavity having the conformation of the article including its base portion and having a discharge opening at its lower end and the outer portion only of said charge has been permitted to solidify, the steps which include applying pneumatic pressure against the end surface of the charge in the top of the mold cavity and expelling through said discharge opening the still fluent axial portion of the charge in the form of a bubble projecting from and connected with the end of the article, then removing the article from the mold with its supporting base completed as an integral part of the finished article, and then removing the bubble to complete the glass article.

EUGENE SCHWARZ.